United States Patent
Kim et al.

(10) Patent No.: US 10,730,547 B2
(45) Date of Patent: Aug. 4, 2020

(54) ELECTRONIC CONTROL UNIT OF STEERING SYSTEM FOR VEHICLE

(71) Applicant: MANDO CORPORATION, Gyeonggi-do (KR)

(72) Inventors: JinHwan Kim, Seoul (KR); Joon Ho Jung, Gyeonggi-do (KR); Ji Hwan Kim, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 256 days.

(21) Appl. No.: 15/896,069

(22) Filed: Feb. 14, 2018

(65) Prior Publication Data
US 2018/0229763 A1   Aug. 16, 2018

(30) Foreign Application Priority Data
Feb. 15, 2017  (KR) .......................... 10-2017-0020390

(51) Int. Cl.
*B62D 5/04* (2006.01)
*B62D 15/02* (2006.01)
(Continued)

(52) U.S. Cl.
CPC .......... *B62D 5/0481* (2013.01); *B62D 5/0406* (2013.01); *B62D 5/046* (2013.01); *B62D 5/0409* (2013.01); *B62D 15/0235* (2013.01); *H02K 5/225* (2013.01); *H02K 11/33* (2016.01); *H02K 2213/09* (2013.01)

(58) Field of Classification Search
CPC ..... B62D 5/0481; B62D 5/046; B62D 5/0406
See application file for complete search history.

(56) References Cited

U.S. PATENT DOCUMENTS 5,261,828 A * 11/1993 Kandybowski ........ H01R 12/91
439/79
5,975,933 A * 11/1999 Yamaguchi ............. B60R 15/02
439/247
(Continued)

FOREIGN PATENT DOCUMENTS

JP      3091615     11/2002
JP      4252486     4/2009

OTHER PUBLICATIONS

Office Action dated Dec. 1, 2017 for Korean Patent Application No. 10-2017-0020390 and its English machine translation by Google Translate.

*Primary Examiner* — Jacob D Knutson
*Assistant Examiner* — Michael R Stabley
(74) *Attorney, Agent, or Firm* — Ladas & Parry, LLP

(57) ABSTRACT

The present disclosure relates to an electronic control unit of a steering system for a vehicle. The electronic control unit includes: a case having shaft supporting portions formed at ends of sides facing each other; a connector electrically connected with a substrate and coupled to the case through a rotary shaft coupled to ends of the shaft supporting portions such that that direction of connecting ports to be connected with a harness is adjusted, in which a protrusive first coupling portion is formed at any one of the shaft supporting portion and the rotary shaft and a second recessed coupling portion that is coupled to the first coupling portion is formed at the other one so that the connector is coupled and fixed to the case.

11 Claims, 14 Drawing Sheets

(51) Int. Cl.
*H02K 11/33* (2016.01)
*H02K 5/22* (2006.01)

(56) References Cited

U.S. PATENT DOCUMENTS

| | | | | |
|---|---|---|---|---|
| 6,848,925 B2* | 2/2005 | Nishide | ............... | H01R 13/73 439/157 |
| 7,465,185 B2* | 12/2008 | Tyler | ............... | H01R 13/506 439/352 |
| 7,621,367 B2* | 11/2009 | Tominaga | ............... | B62D 5/0406 180/444 |
| 7,695,298 B2* | 4/2010 | Arndt | ............... | H01R 35/02 439/165 |
| 8,446,111 B2* | 5/2013 | Sonoda | ............... | B62D 5/0406 180/6.44 |
| 8,471,418 B2* | 6/2013 | Yamasaki | ............... | B62D 5/0406 310/68 R |
| 8,963,388 B2* | 2/2015 | Miyachi | ............... | B62D 5/0406 310/71 |
| 9,180,906 B2* | 11/2015 | Suga | ............... | H02K 5/225 |
| 9,450,476 B2* | 9/2016 | Ito | ............... | H02K 11/38 |
| 2014/0085839 A1* | 3/2014 | Nakano | ............... | H05K 5/06 361/752 |
| 2016/0036296 A1* | 2/2016 | Kabune | ............... | H02K 11/33 180/446 |
| 2016/0347354 A1* | 12/2016 | Asao | ............... | B62D 5/0406 |
| 2017/0015347 A1* | 1/2017 | Asao | ............... | B62D 5/0406 |

\* cited by examiner

ELECTRONIC CONTROL UNIT OF STEERING SYSTEM FOR VEHICLE

CROSS REFERENCE TO RELATED APPLICATION

This application claims priority from Korean Patent Application No. 10-2017-0020390, filed on Feb. 15, 2017, which is hereby incorporated by reference for all purposes as if fully set forth herein.

BACKGROUND OF THE INVENTION

1. Field of the Invention

The present disclosure relates to an electronic control unit of a steering system for a vehicle. More particularly, the present disclosure relates to an electronic control unit of a steering system for a vehicle, wherein the electronic control unit is coupled to a flange portion on the outer side of an electric device so there is no need for a specific bracket used for fixing an electronic control unit in the related art, the number of necessary parts can be reduced, the entire product can be compactly configured, there is no need for a lead wire used for changing the limited direction of connecting ports of a connector in the related art, the electronic control unit can be easily assembled, and an assembly space is secured without interference with surrounding parts because the direction of a connector can be changed to fit to the space for assembling the electronic control unit.

2. Description of the Prior Art

In general, the steering system of a vehicle includes an electronic control unit that generates control signals on the basis of electrical signals from various sensors, a motor that generates assistant power on the basis of a signal from the electronic control unit, and a reducer that transmits the assistant power from the motor to a steering column.

The electronic control unit is coupled and fixed to a specific bracket, and the electronic control unit and the motor are connected to each other through a long wire harness.

However, according to the electronic control unit of a steering system for a vehicle in the related art, there is a need for a specific bracket structure for fixing the electronic control unit and a long wire harness for connecting the electronic control unit and a motor to each other, so there is a problem that the assembly structure is complicated and the entire weight is increased. Further, there is also a problem that electromagnetic waves are generated by the long wireless harness.

Further, since the connector of the electronic control unit is integrally formed, the direction of the connecting port, to which the harness is connected, of the connector cannot be changed, so assemblage is difficult. Further, since there is a need for a specific lead wire to change the direction of the connecting port, the number of parts is increased. Further, since the connector is integrally formed, interference with surrounding parts is generated and it is difficult to mount the electronic control unit in a small assembly space.

SUMMARY OF THE INVENTION

In this background, an aspect of the present disclosure is to provide an electronic control unit of a steering system for a vehicle, wherein the electronic control unit is coupled to a flange portion on the outer side of an electric device so there is no need for a specific bracket used for fixing an electronic control unit in the related art, the number of necessary parts can be reduced, and the entire product can be compactly configured.

Another aspect of the present disclosure is to provide an electronic control unit of a steering system for a vehicle, wherein the electronic control unit not requiring a lead wire is used for changing the limited direction of connecting ports of a connector in the related art, is able to be easily assembled, and allows for securing an assembly space without interference with surrounding parts because the direction of a connector can be changed to fit to the space for assembling the electronic control unit.

The present disclosure is not limited thereto and other aspects may be clearly understood by those skilled in the art from the following description.

In accordance with an aspect of the present disclosure, there is provided an electronic control unit of a steering system for a vehicle. The electronic control unit includes: a case receiving a substrate therein and having shaft supporting portions formed at ends of sides facing each other; and a connector electrically connected with a substrate and coupled to the case through a rotary shaft coupled to ends of the shaft supporting portions such that that direction of connecting ports to be connected with a harness is adjusted, in which a protrusive first coupling portion is formed at any one of the shaft supporting portion and the rotary shaft and a second recessed coupling portion that is coupled to the first coupling portion is formed at the other one so that the connector is coupled and fixed to the case.

In accordance with another aspect of the present disclosure, there is provided an electronic control unit of a steering system for a vehicle. The electronic control unit includes: a connector configured to have a rotary shaft electrically connected with a substrate at an end, have connecting ports connected with a harness at an end of the rotary shaft, have first coupling portions protruding from axial ends of the rotary shaft, and have first fixing holes respectively formed radially through the first coupling portions; a case configured to receive the substrate therein, have shaft supporting portions formed at ends of sides facing each other to be coupled to the rotary shaft, have second coupling portions at the shaft supporting portions such that the first coupling portions are inserted therein, and have second fixing holes respectively formed at the second fixing portions to communicate with the first fixing holes; and fixing members configured to be inserted in the first fixing holes and the second fixing holes.

According to the aspects, a flange portion is formed on the outer side of an electric device and an electronic control unit is coupled to the flange portion, whereby there is no need for a specific bracket that is used for fixing an electronic control unit in the related art, so it is possible to reduce the number of necessary parts and manufacture the entire product in a compact size.

Further, there is no need for a lead wire used for changing the limited direction of connecting ports of a connector in the related art, it is possible to make assemblage easy, and it is also possible to secure an assembly space without interference with surrounding parts because the direction of a connector can be changed to fit to the space for assembling the electronic control unit.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
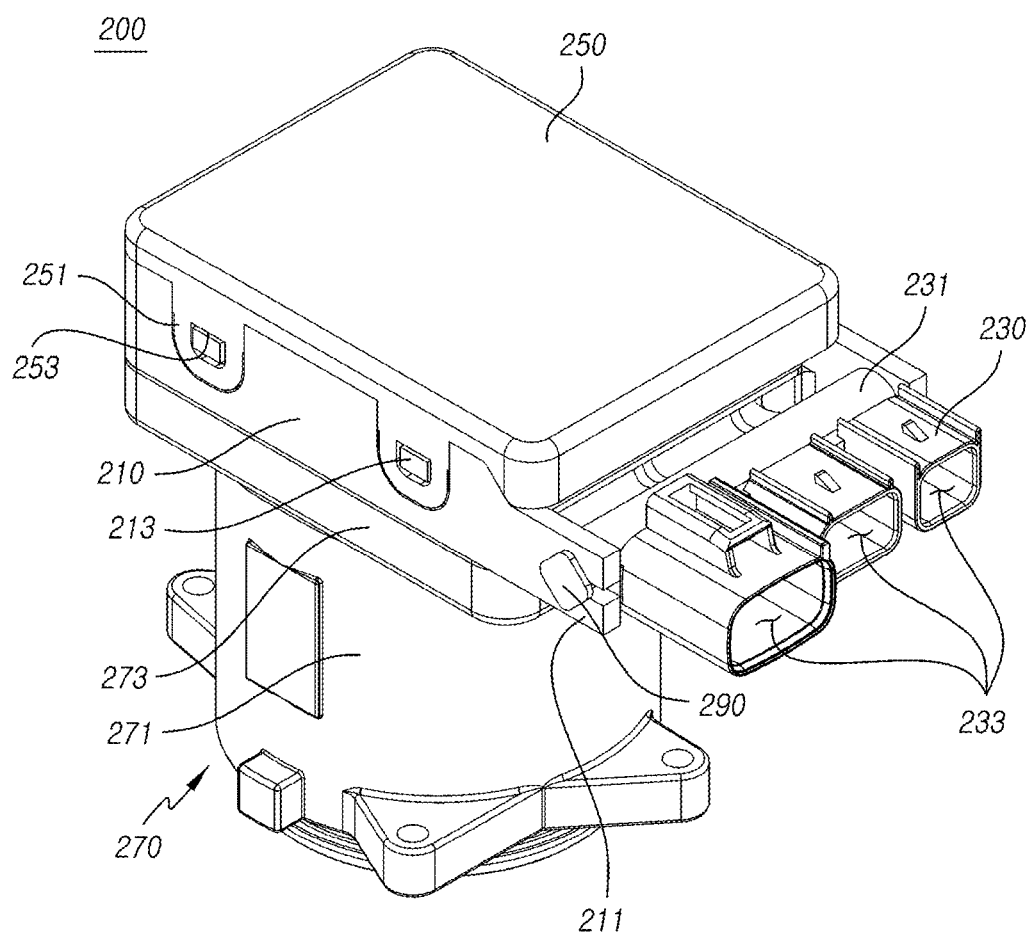
FIG. 1 is a perspective view showing a portion of an electronic control unit of a steering system for a vehicle according to an embodiment.

Hereinafter, embodiments of the present disclosure will be described in detail with reference to the accompanying drawings. In adding reference numerals to elements in each drawing, it should be noted that the same elements are designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 2:
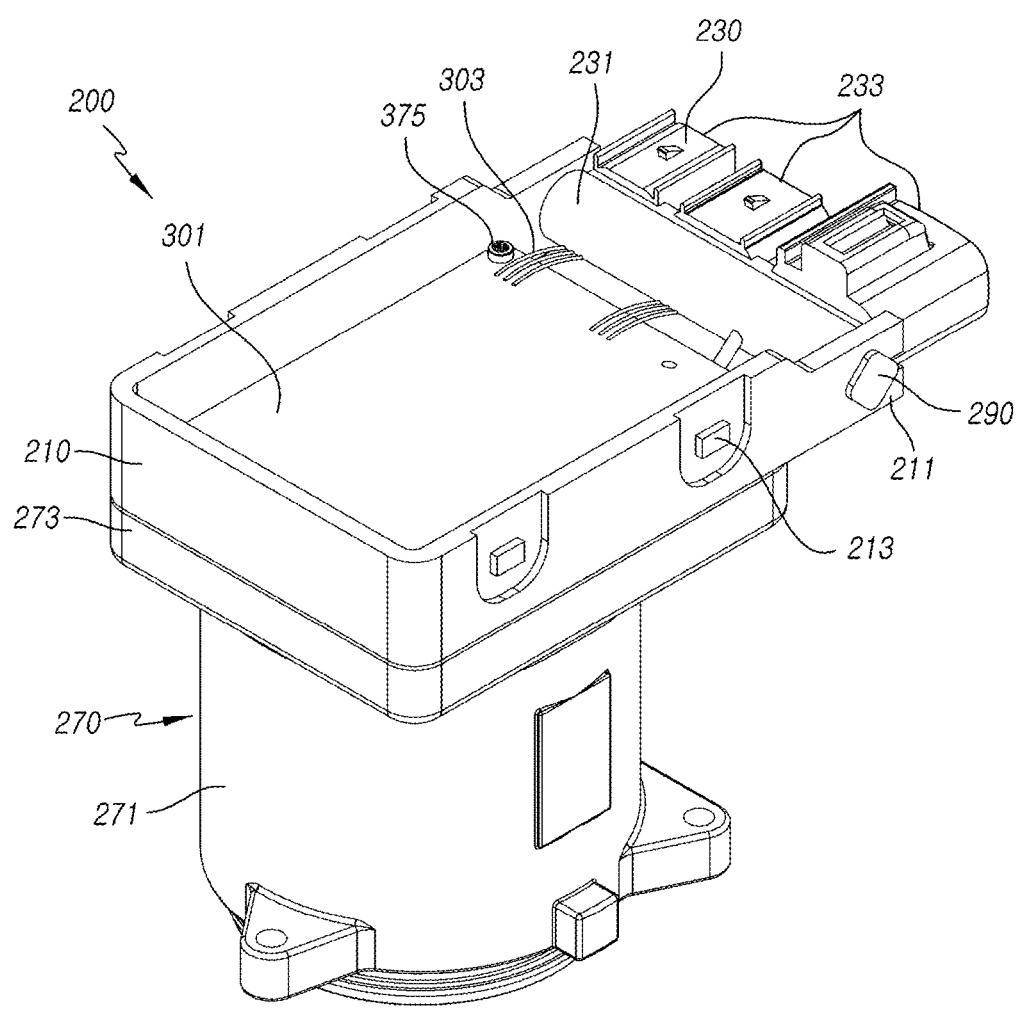
FIG. 2 is a perspective view with a cover removed from FIG. 1.
Figure 3:
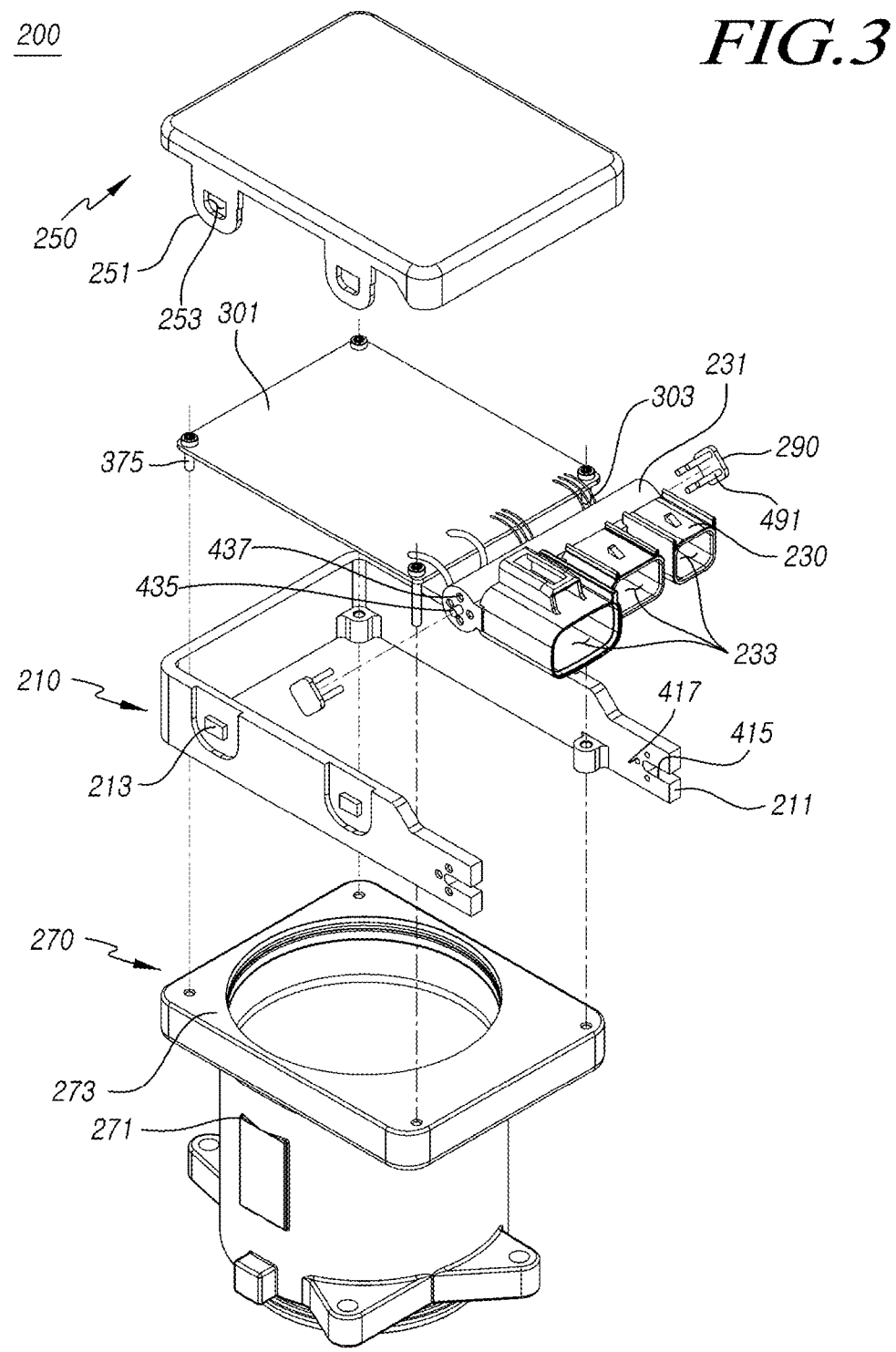
FIG. 3 is an exploded perspective view of FIG. 1.
Figure 4:
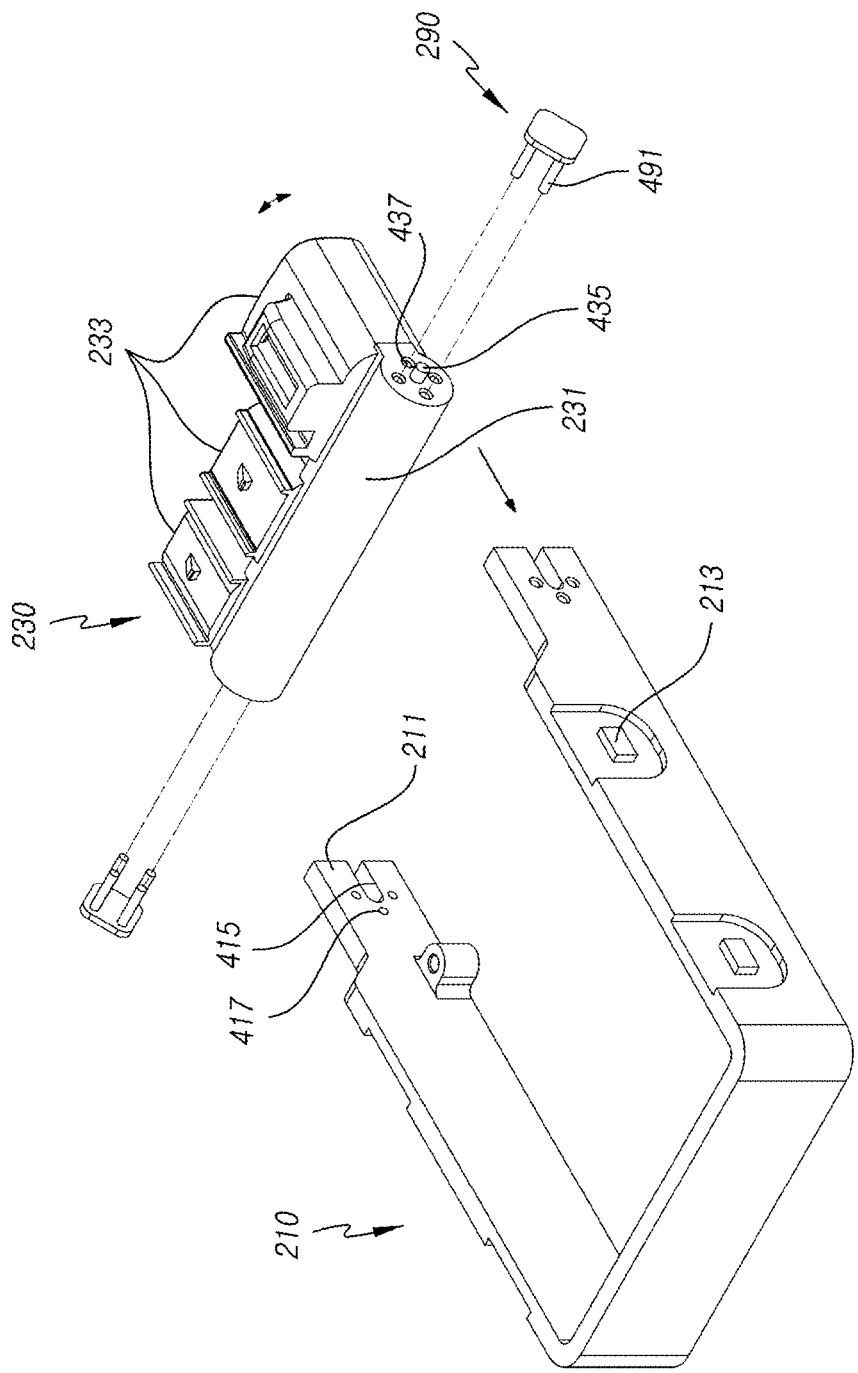
FIG. 4 is an exploded perspective view showing a portion of the electronic control unit of a steering system for a vehicle according to an embodiment.
Figure 5:
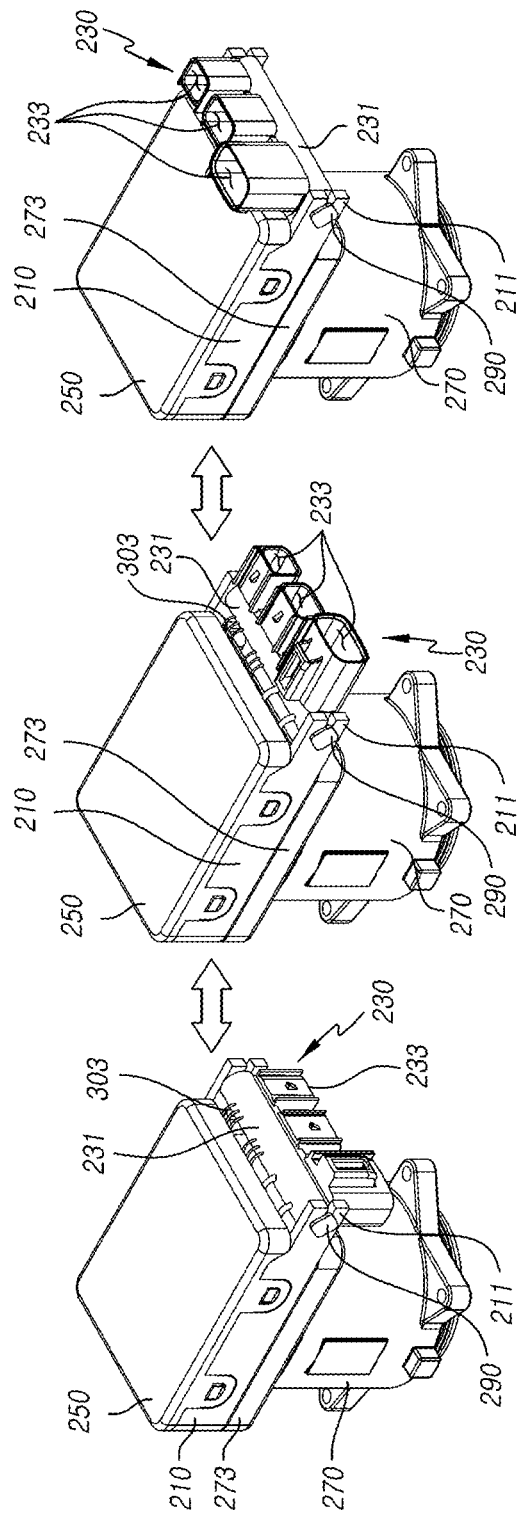
FIG. 5 is a view showing positions where a connector is rotated and coupled in an electronic control unit of a steering system for a vehicle according to an embodiment.
Figure 9:
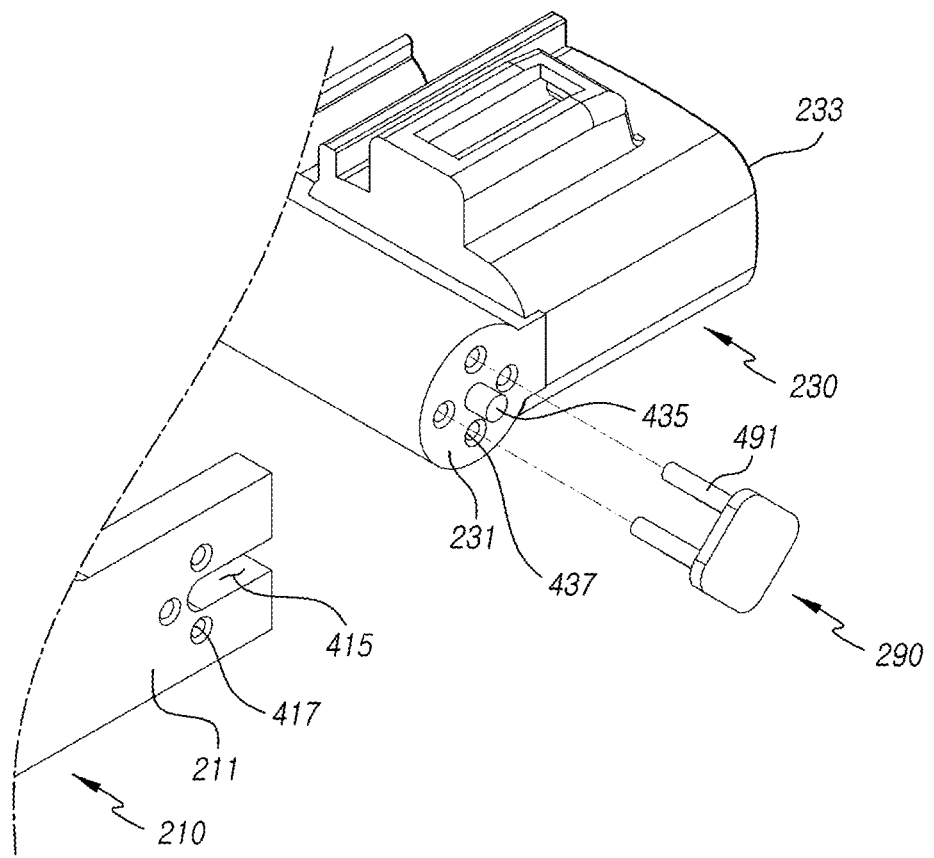
Figure 10:
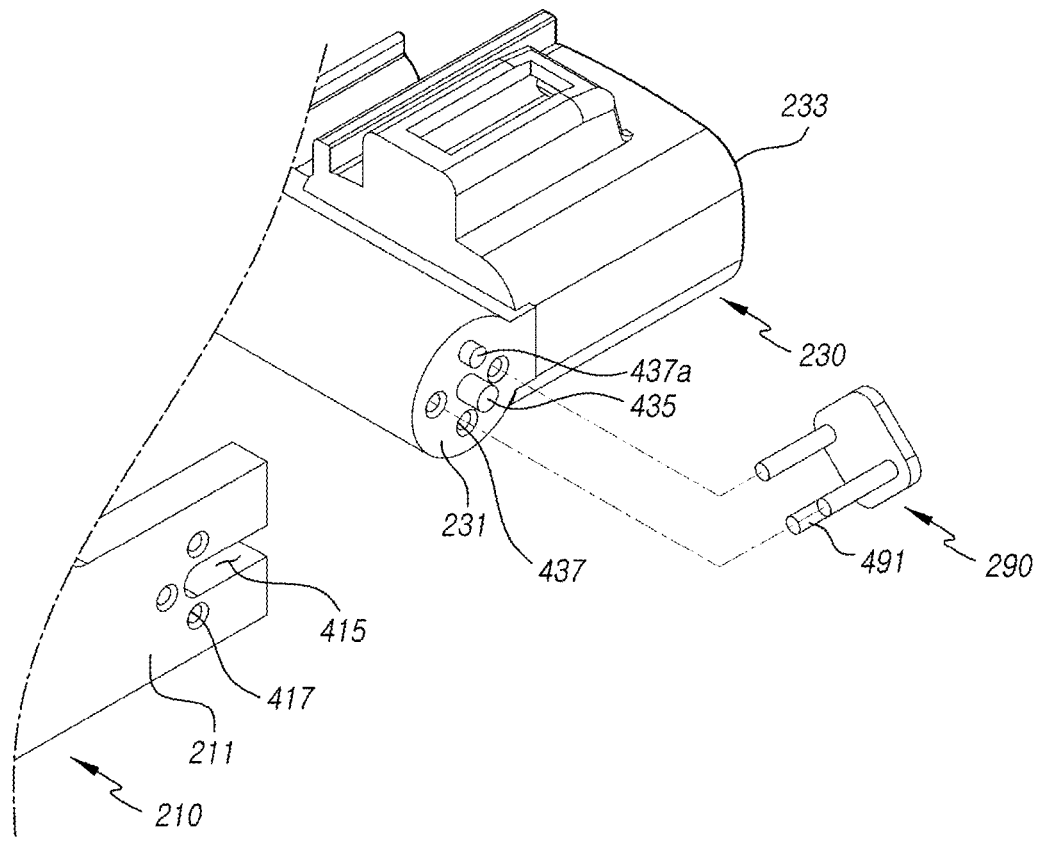
Figure 11:
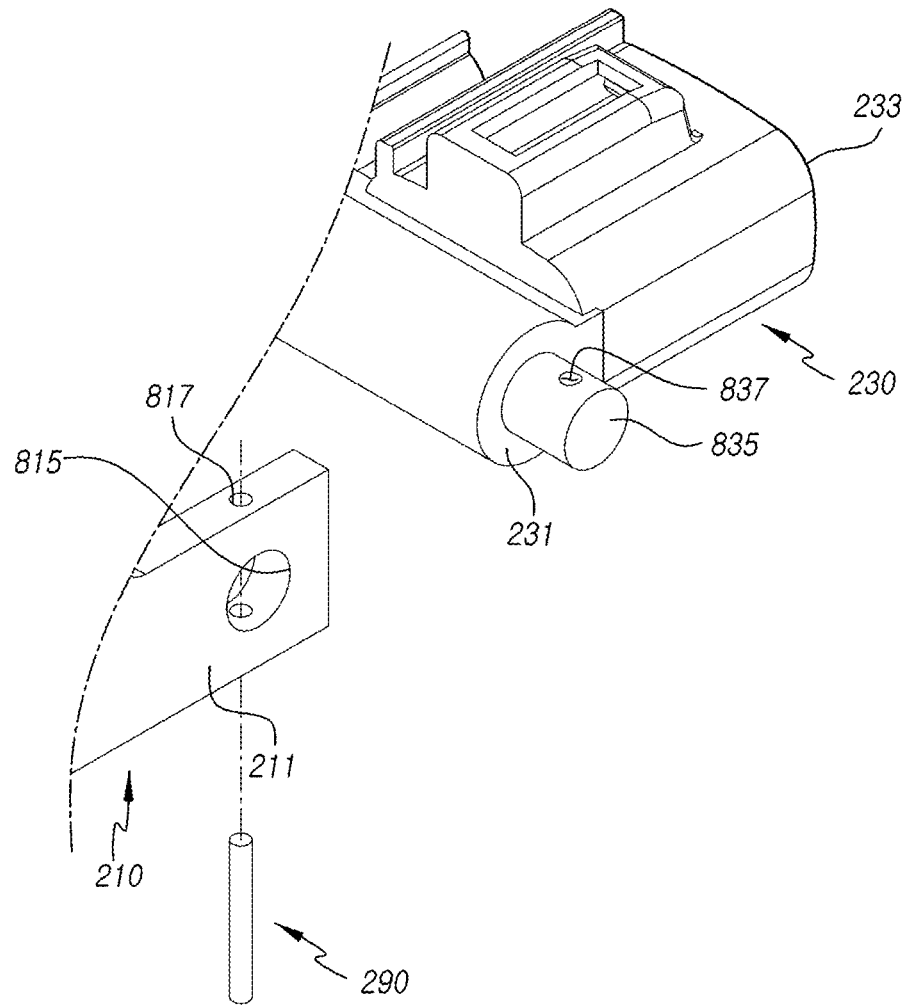
Figure 12:
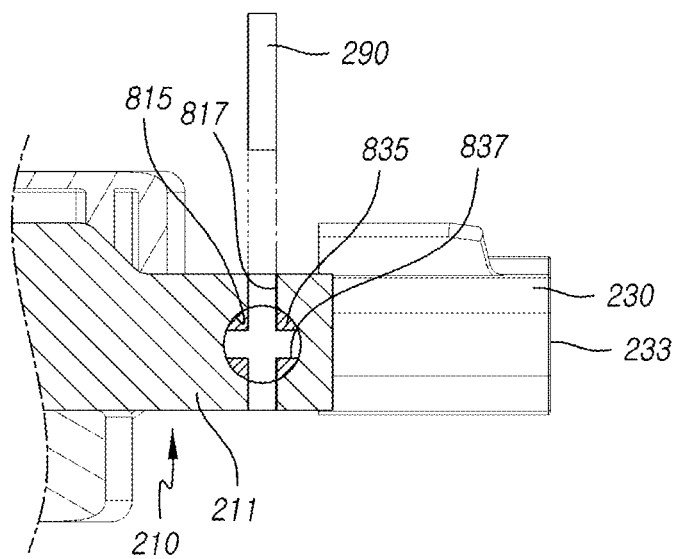
FIGS. 12 and 13 are cross-sectional views showing the coupling state of FIG. 11.
Figure 13:
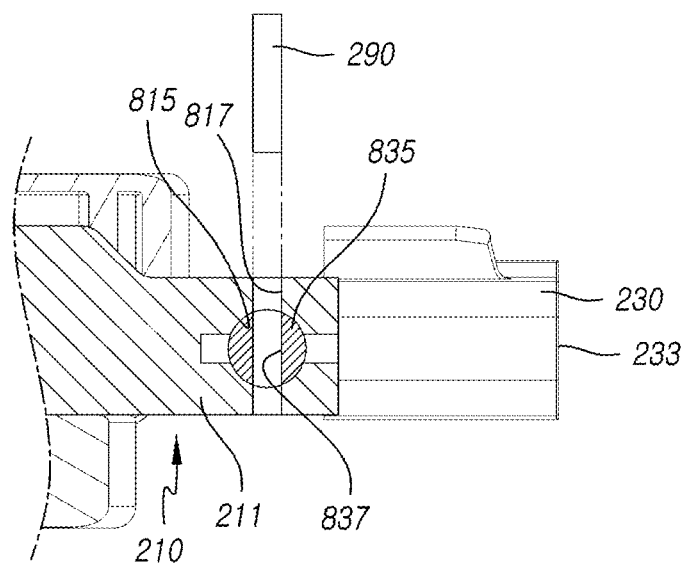
Figure 14:
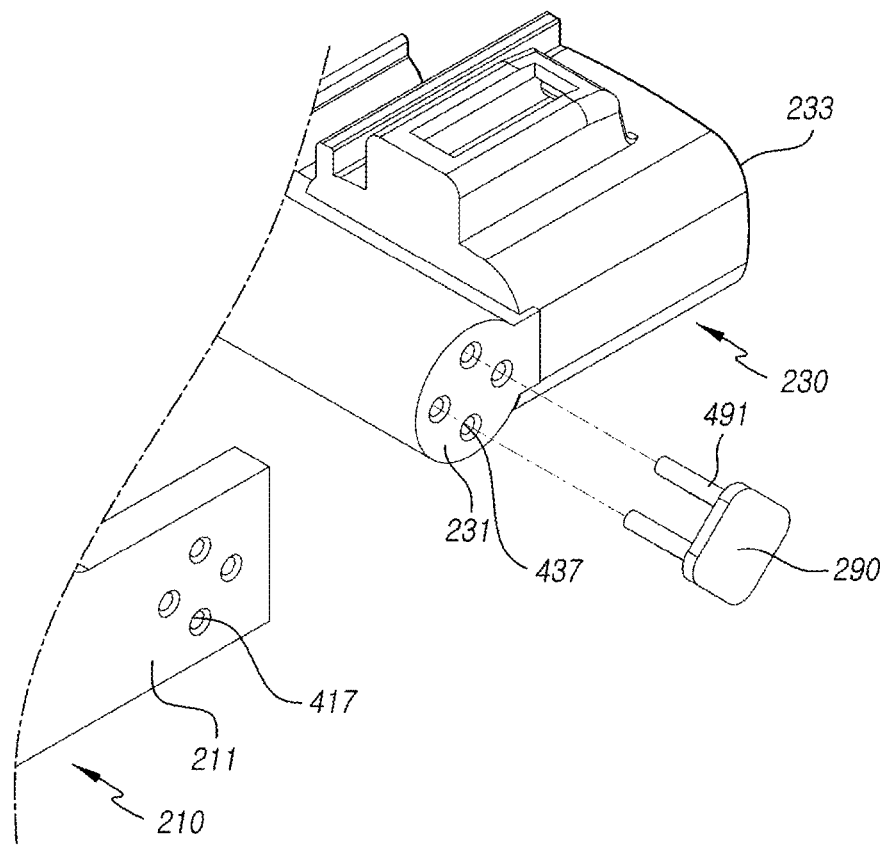
FIG. 14 is an exploded perspective view showing a portion of an electronic control unit of a steering system for a vehicle according to another embodiment.

FIG. 1 is a perspective view showing a portion of an electronic control unit of a steering system for a vehicle according to an embodiment, FIG. 2 is a perspective view with a cover removed from FIG. 1, FIG. 3 is an exploded perspective view of FIG. 1, FIG. 4 is an exploded perspective view showing a portion of the electronic control unit of a steering system for a vehicle according to an embodiment, FIG. 5 is a view showing positions where a connector is rotated and coupled in an electronic control unit of a steering system for a vehicle according to an embodiment, FIGS. 6 to 11 are exploded perspective views showing a portion of an electronic control unit of a steering system for a vehicle according to various embodiments, FIGS. 12 and 13 are cross-sectional views showing the coupling state of FIG. 11, and FIG. 14 is an exploded perspective view showing a portion of an electronic control unit of a steering system for a vehicle according to another embodiment.

An electronic control unit 200 of a steering system for a vehicle according to embodiments shown in the figures includes: a case 210 receiving a substrate 301 therein and having shaft supporting portions 211 at ends of sides facing each other; and a connector 230 electrically connected to the substrate 301, having a rotary shaft 231 coupled to ends of the shaft supporting portions 211, and combined with the case 210 such that the directions of connecting ports 233 to be connected to a harness are adjusted, in which first projective coupling portions 435 are formed at any one of the shaft supporting portions 211 and the rotary shaft 231 and second recessed coupling portions 415 coupled to the first coupling portions 435 are formed at the other one so that the connector 230 is coupled and fixed to the case 210.

The electronic control unit 200 includes the case 210 and the substrate 301 having a terminal is disposed inside the case 210.

The case 210 has the shaft supporting portions 211 at ends facing each other of a side and coupling projections 213 are further formed on sides of the shaft supporting portions 211 and are fitted in coupling holes 253 of coupling bridges 251 formed on sides of a cover 250 to be described below.

That is, when the cover 250 is assembled over the case 210, the coupling projections 213 of the case 210 are fitted in the coupling holes 253 of the coupling bridges 251, so the cover 250 and the case 210 can be separably combined.

A plurality of coupling projections 213 is formed, that is, two coupling projections 213 are formed on each of a first side and a second side of the case 210 and four coupling bridges 251 are formed at the cover 250 to correspond to the number of the coupling projections 213, as an example, in the figures.

An electric device 270 is coupled in contact with the bottom of the case 210 and has a flange portion 273 that is in contact with the case 210. The flange portion 273 is integrally formed in a flat plate shape on the outer side of a housing 271 of the electric device 270 and the case 210 is coupled and fixed to the flange portion 273 by fasteners 375.

The electric device 270 includes the housing 271 having the flange portion 273 on the outer side to be coupled in contact with the case 210 and a stator, a rotor, etc. are disposed in the housing 271. For example, the electric device 270 may be a motor, and in this case, a driving force generated by the electric device 270 is transmitted to a reducer through a rotary shaft 231, so it is provided as an assistant steering force.

The connector 230 electrically connected with the substrate 301 is coupled to the ends of the shaft supporting portions 211 formed at an open side of the case 210.

Since the connector 230 is electrically connected with the substrate 301, a wire or a harness connected to a sensor etc. can be electrically connected to the substrate 301.

The connector 230 is integrally formed in an electronic control unit or a substrate in the related art and is manufactured in a housing shape depending on the types of vehicles to satisfy the direction of a connector required for each type of vehicle, which increases the manufacturing cost.

Alternatively, the work of connecting a harness to a connector, using a lead wires etc., to satisfy the direction of a connector required for each type of vehicle is made easy.

Accordingly, according to an embodiment, the connector 230 is separated and coupled and fixed to the electronic control unit 200 such that the direction of the connector 230 is adjusted without forming a specific lead wire or various housing, so the manufacturing cost can be reduced and the assembly direction can be easily changed. Accordingly, assemblage is easy and the space for assembly can be more efficiently used.

The connector 230 includes connecting ports 233 that are connected with harnesses and the rotary shaft 231 coupled to the shaft supporting portions 211 and both ends of the rotary shaft 231 are rotatably coupled to the shaft supporting portions 211, so the direction of the connecting ports 233 can be adjusted.

The connector 230 is electrically connected to the substrate 301 through wires 303 such as electrical wires and is rotatably coupled to the shaft supporting portions 211.

The direction of the connecting ports 233 of the connector 230 is adjusted by rotating the connector 230 about the rotary shaft 231 coupled to the shaft supporting portions 211 in consideration of the assembly direction and the assembly space.

For example, there is a need for a specific lead wire etc. for changing the direction of the connecting ports 233 to coupling the electronic control unit 200 to the electric device 270 with the connecting ports 233 of the connector 230 arranged in a first direction and then connect harnesses in a second direction, but according to an embodiment, since the connector 230 is rotatably coupled to the shaft supporting portions 211, there is no need for a specific lead wire etc.

FIG. 5 shows a process of adjusting the direction of the connector 230 rotatably coupled to the shaft supporting portions 211.

The left one in FIG. 5 shows the connector 230 rotated toward the electric device 270 such that the connecting ports 233 of the connector 230 face down, in which a harness can be easily coupled to the connector 230 from thereunder.

The middle one in FIG. 5 shows the connector 230 rotated in parallel with the shaft supporting portions 211 such that the connecting ports 233 of the connector 230 are horizontally arranged, in which a harness can be easily horizontally coupled to the connector 230.

The right one in FIG. 5 shows the connector 230 rotated in the opposite direction to the electric device 270 such that the connecting ports 233 of the connector 230 face up, in which a harness can be easily coupled to the connector 230 from above.

In order to couple the connector 230 to the shaft supporting portions 211 and adjust the direction of the connector 230, the connector 230 is separated from the shaft supporting portions 211, rotated in a desired direction, and then coupled back to the shaft supporting portions 211 to be fixed in the rotated state.

Since the connector 230 is coupled to the case 210 and rotated, as described above, the direction of the connecting ports 233 can be adjusted up, down, and horizontally, and the coupling portions of the shaft supporting portions 211 of the case 210 and the rotary shaft 231 of the connector 230 for coupling and fixing the case 210 and the connector 230 to each other in the adjusted directions may be implemented in various embodiments, as shown in FIGS. 6 to 14.

First, according to the embodiments shown in FIGS. 1 to 5, the first projective coupling portions 435 are formed at any one of the shaft supporting portions 211 and the rotary shaft 231 and the second recessed coupling portions 415 coupled to the first coupling portions 435 are formed at the other one.

For the convenience of describing the first coupling portions 435 and the second coupling portions 415, for example, it is assumed that the first coupling portions 435 are formed at the rotary shaft 231 and the second coupling portions 415 are formed at the shaft supporting portions 211, but the first coupling portions 435 may be formed at the shaft supporting portions 211 and the second coupling portions 415 may be formed at the rotary shaft 231.

Figure 6:
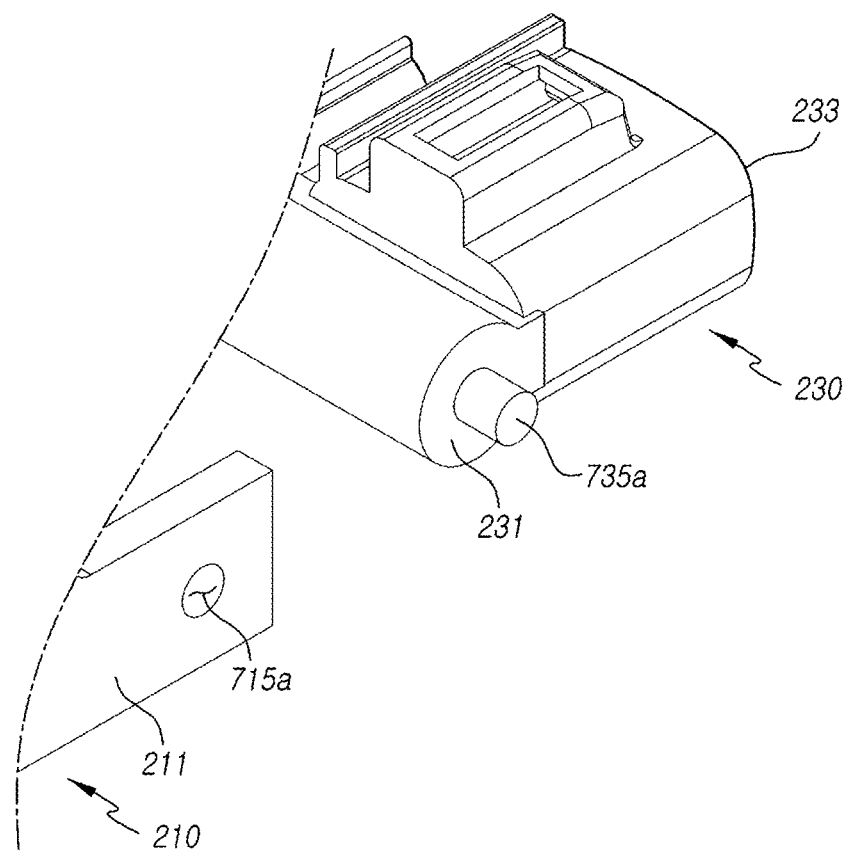
FIGS. 6 to 11 are exploded perspective views showing a portion of an electronic control unit of a steering system for a vehicle according to various embodiments.
Figure 7:
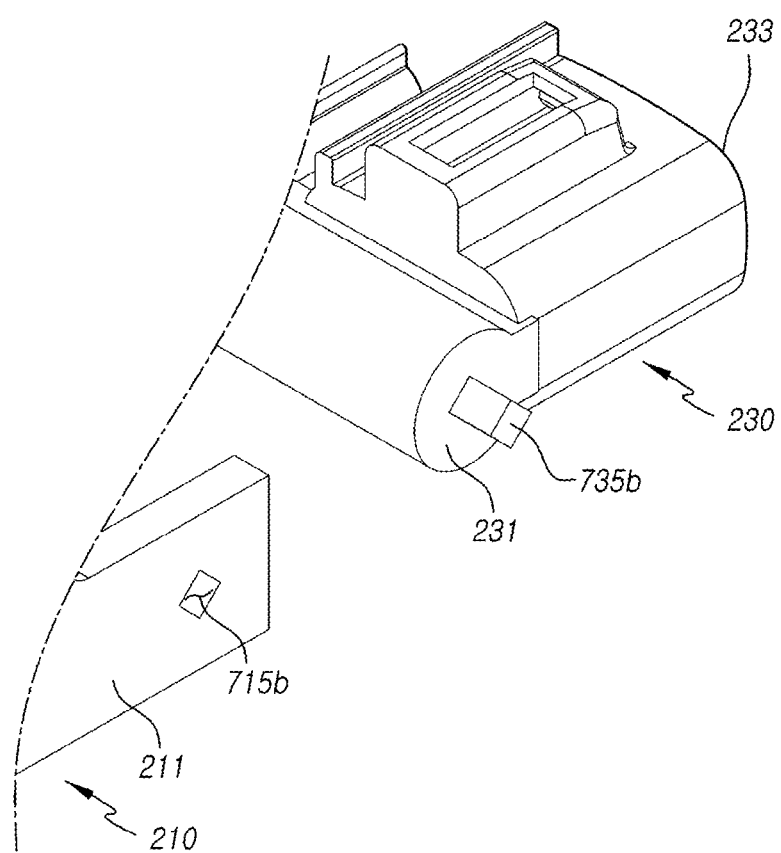

Referring to FIGS. 6 and 7, first coupling portions 735a protrude axially from both ends of the rotary shaft 231 and second coupling portions 715a are recessed on both shaft supporting portions 211 that are brought in contact with the rotary shaft 231 such that the first coupling portions 735a are fitted therein.

Though not shown in the figures, the second coupling portions 715a may be axially recessed at both ends of the rotary shaft 231 and the first coupling portions 735a may protrude toward the rotary shaft 231 from the inner sides of the shaft supporting portions 211 that are brought in contact with the rotary shaft 231 to be fitted in the second coupling portions 715a.

The first coupling portions 735a and the second coupling portions 715a are fitted to each other, as shown in FIG. 6, that is, the direction of the connector 230 is adjusted with respect to the shaft supporting portions 211 and then the first coupling portions 735a are fitted into the second coupling portions 715a.

Alternatively, as shown in FIG. 7, first coupling portions 735b and second coupling portions 715b may be formed to have a regular polygonal cross-section to prevent idling between the first coupling portions 735b and the second coupling portions 715b.

The cross-sectional shape of the first coupling portions 735b and the second coupling portions 715b may be a regular triangle, a regular square, or a regular pentagon, and when it is a regular square, it is possible to adjust the direction of the connector 230 up, down, and horizontally by rotating the connector 230 by 90 degrees at each time.

Alternatively, when the cross-sectional shape of the first coupling portions 735b and the second coupling portions 715b has a regular octagon, it is possible to adjust the direction of the connector 230 in diagonal directions other than up, down, and horizontally by rotating the connector 230 by 45 degrees at each time.

The first coupling portions 735b and the second coupling portions 715b should be able to be coupled to each other even though the connector 230 is rotated with respect to the shaft supporting portions 211, so the cross-section is formed in a regular polygonal shape, and accordingly, idling between the first coupling portions 735b and the second coupling portions 715b is prevented by the polygonal shape after coupling.

Figure 8:
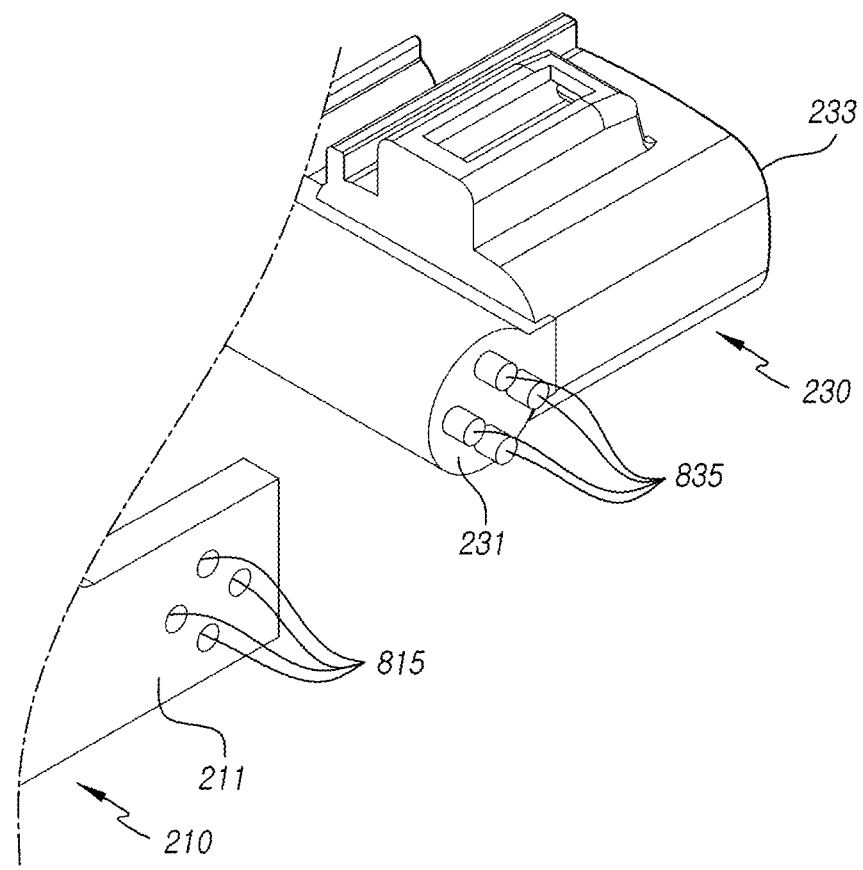

According to another embodiment shown in FIG. 8, a plurality of first coupling portions 835 is formed on both ends of the rotary shaft 231 and a plurality of second coupling portions 815 is also formed on the shaft supporting portions 211 at positions corresponding to the first coupling portions 835 to prevent idling between the first coupling portions 835 and the second coupling portions 815.

The first coupling portions 835 and the second coupling portions 815 are arranged circularly with the same intervals, so even though the connector 230 is rotated, the first coupling portions 835 can be coupled to the second coupling portions 815.

For example, as shown in the figure, the first coupling portions 835 protrude at four positions from the rotary shaft 231 and are arranged circumferentially with the same intervals and the second coupling portions 815 are formed on the shaft supporting portions 211 at four positions corresponding to the first coupling portions 835.

Accordingly, the first coupling portions 835 and the second coupling portions 815 are each arranged with intervals of 90 degrees, so the direction of the connecting ports 233 of the connector 230 can be adjusted by rotating them by 90 degrees at each time.

Further, though not shown in the figures, the first coupling portions 835 and the second coupling portions 815 each may be formed at eight positions circumferentially with the same intervals, and in this case, the direction of the connecting ports 233 of the connector 230 can be adjusted at various angles by rotating them by 45 degrees at each time.

Further, according to other embodiments shown in FIGS. 9 to 13, first fixing holes 437 and 837 may be formed at the rotary shaft 231, second fixing holes 417 may be formed at the shaft supporting portions 211, and fixing members 290 fitted in the first fixing holes 437 and 837 and the second fixing holes 417 may be provided to prevent idling between first coupling portions 435 and 835 and second coupling portions 415 and 815.

The first fixing holes 437 and 837 and the second fixing holes 417 may be formed in the axial direction or radial direction of the rotary shaft 231.

First, referring to FIG. 9, first fixing holes 437 and second fixing holes 417 are formed in the axial direction of the rotary shaft 231 and are arranged circumferentially around a first coupling portion 435 and a second coupling portion 415, respectively.

A fixing member 290 may be formed in a pin shape to be inserted in the first fixing holes 437 and the second fixing holes 417, or a fixing member 290 may be formed in a plate shape with one or more fixing pins 491 protruding in the axial direction of the rotary shaft 231 to be inserted in the first fixing holes 437 and the second fixing holes 417.

Accordingly, in order to couple the first coupling portion 435 and the second coupling portion 415 to each other and prevent idling between the first coupling portion 435 and the second coupling portion 415, the fixing member 290 is fitted in the first fixing holes 437 and the second fixing holes 417, thereby stably fixing the shaft supporting portions 211 and the connector 230.

In order to adjust the direction of the connector 230 to be coupled to the shaft supporting portions 211, the first fixing hole 437 or the second fixing hole 417 may be several pieces, and the first fixing holes 437 and the second fixing holes 417 are arranged circumferentially around the first coupling portion 435 and the second coupling portion 415.

Since the first fixing holes 437 and the second fixing holes 417 are arranged circumferentially around the first coupling portion 435 and the second coupling portion 415, the direction of the connector 230 is adjusted by rotating the connector 230 about the first coupling portion 435 and the second coupling portion 415 such that the first fixing holes 437 and the second fixing holes 417 are aligned with each other, and then by coupling the fixing members 290.

When a plurality of the first fixing holes 437 is formed at the shaft supporting portion 211, it is possible to adjust the direction of the connector 230 to be coupled to the shaft supporting portion 211 even if only one second fixing hole 417 is formed at the connector 230. On the contrary, when a plurality of second fixing holes 417 is formed at the connector 230, it is possible to adjust the direction of the connector 230 to the coupled to the shaft supporting portion 211 even if only one first fixing hole 437 is formed at the shaft supporting portion 211.

In this case, the direction of the connector 230 is adjusted in accordance with the arrangement of the first fixing holes 437 or the second fixing holes 417.

Alternatively, a plurality of first fixing holes 437 and second fixing holes 417 may be formed at the shaft supporting portions 211 and the connector 230, respectively, and in this case, the first fixing holes 437 and the second fixing holes 417 are arranged circumferentially with the same intervals around the first coupling portion 435 and a second coupling portion 415, respectively.

The fixing member 290 may be formed in a pin shape, but in this case, it may be formed in a plate shape with at least two fixing pins 491 protruding in the axial direction of the rotary shaft 231 to be inserted in the first fixing holes 437 and the second fixing holes 417, whereby idling between the shaft supporting portion 211 and the connector 230 can be prevented.

For example, although in the figure the first fixing holes 437 and the second fixing holes 417 are formed at four positions at the shaft supporting portion 211 and the connector 230, respectively, it is possible to adjust the direction of the connecting ports 233 by rotating the connector down, up, and horizontally.

Further, though not shown in the figure, the shaft supporting portions 211 and the connector 230 can be combined in any types as long as the connector 230 can be rotated and then coupled.

The first coupling portion 435 axially protruding from the rotary shaft 231 may be a projection and the second coupling portion 415 axially recessed at the shaft supporting portion 211 may be a slit with an open side, so the first coupling portion 435 can be inserted from an end of the second coupling portion 415 to be supported by the other end.

In other words, the first coupling portions 435 and the second coupling portions 415 are respectively formed at the rotary shaft 231 and the shaft supporting portions 211, so the connector 230 can be coupled to ends of the shaft supporting portions 211 and rotated in this state, and the ends of the shaft supporting portions 211 and the connector 230 can be maintained in the coupled state even if the fixing members 290 are separated out of the first fixing holes 437 and the second fixing holes 417.

Further, the direction of the connecting ports 233 is adjusted by rotating the connector 230 with the first coupling portions 435 and the second coupling portions 415 coupled to each other, and after the direction of the connecting ports 233 is adjusted, the fixing members 290 are inserted into the first fixing holes 437 and the second fixing holes 417, thereby fixing the connector 230 in the rotated state.

The second coupling portion 415 formed in a silt shape with an open side may be narrowed toward a second end from a first end, so the first coupling portion 435 deforms the slit while moving from the first end to the second end to be coupled.

Referring to FIG. 10, a plurality of first fixing holes 437 and a plurality of second fixing holes 417 may be formed and arranged circumferentially with the same intervals.

A supporting member 437a that is inserted and supported in the second fixing holes 417 is disposed on any one of the first fixing holes 437 so that the rotational angle of the connector 230 is set by the supporting member 437a when the rotary shaft 231 and the shaft supporting portions 211 are coupled, and then the connector 230 is fixed by the fixing member. The supporting member 437a may integrally protrude to corresponding to a first fixing hole 437 or may be separately formed and then fitted in a first fixing hole 437.

Referring to FIGS. 11 to 13 together with FIG. 3, an electronic control unit of a steering system for a vehicle according to an embodiment may include: a connector 230 that has a rotary shaft 231 electrically connected with a substrate 301 at an end, has connecting ports 233 connected with a harness at an end of the rotary shaft 231, has first coupling portions 835 protruding from axial ends of the rotary shaft 231, and has first fixing holes 837 respectively formed radially through the first coupling portions 835; a case 210 that receives the substrate therein, has shaft supporting portions 211 formed at ends of sides facing each other to be coupled to the rotary shaft 231, has second coupling portions 815 at the shaft supporting portions 211 such that the first coupling portions 835 are inserted therein, and has second fixing holes 817 respectively formed at the second fixing portions 815 to communicate with the first fixing holes 837; and fixing members 290 that are inserted in the first fixing holes 837 and the second fixing holes 817.

That is, the first fixing hole 837 is radially formed through the first coupling portion 835, the second coupling portion 815 in which the first coupling portion 835 is inserted is formed at the shaft supporting portion 211, and the first fixing hole 837 and the second fixing hole 817 are formed in the radial direction of the rotary shaft 231. Further, the first fixing hole 837 and the second fixing hole 817 are formed through the first coupling portion 835 and the second coupling portion 815, respectively, and the fixing member 290 is inserted in the fixing holes, thereby preventing idling between the first coupling portion 835 and the second coupling portion 815.

The fixing member 290 is formed in a pin shape and inserted in both of the first fixing hole 837 and the second fixing hole 817, thereby fixing the shaft supporting portion 211 and the connector 230.

The first fixing hole 837 or/and the second fixing hole 817 may be formed in two directions to perpendicularly cross each other, as shown in FIG. 12, to be able to adjust the direction of the connector 230 to be coupled to the case 210, so the direction of the connector 230 to be coupled to the case 210 can be adjusted up, down, and horizontally.

That is, even if the first fixing holes 837 are formed in two directions to perpendicularly cross each other at the connector 230 and only one second fixing hole 817 is formed at the case 210, as shown in FIG. 12, or the second fixing holes 817 are formed in two directions to perpendicularly cross each other at the shaft supporting portion 211 and only one first fixing hole 837 is formed at the connector, as shown in FIG. 13, the connector 230 can be rotated and coupled to the shaft supporting portion 211.

Further, the first fixing holes 837 may be formed in two directions to perpendicularly cross each other at the connector 230 and the second fixing holes 817 may be formed in two directions to perpendicularly cross each other at the shaft supporting portion 211 such that the fixing member 290 can be inserted downward or horizontally.

The first fixing holes 837 and the second fixing holes 817 may be formed in two direction to perpendicularly cross each other respectively such that the direction of the connector 230 can be adjusted up, down, and horizontally, but, though not shown in the figures, additional holes may be formed diagonally to perpendicular to each other in addition to the first fixing holes 837 and the second fixing holes 817 formed in two directions to perpendicularly cross each other respectively, and in this case, the direction of the connector 230 can be adjusted diagonally other than up, down, and horizontally.

According to another embodiment shown in FIG. 14, first fixing holes 437 in which a fixing member 290 is inserted may be formed at a predetermined depth axially in the rotary shaft 231 and second fixing holes 417 through which the fixing member 290 is inserted may be formed at the shaft supporting portion 211, without a first coupling portion and second coupling portion at the rotary shaft 231 and the shaft supporting portion 211.

The first fixing holes 437 and the second fixing holes 417 are arranged with the same intervals circumferentially about the center of the rotary shaft 231, at the rotary shaft 231 and the shaft supporting portion 211, respectively, so the connector 230 can be rotated and then coupled to the shaft supporting portion 211.

The fixing member 290 has fixing pins 491 axially extending, and in this case, at least two or more fixing pins 491 are formed on the fixing member 290 and inserted in the first fixing holes 437 and the second fixing holes 417, thereby preventing idling between the shaft supporting portion 211 and the connector 230.

According to embodiments having these shapes and structures, a flange portion is formed on the outer side of an electric device and an electronic control unit is coupled to the flange portion, whereby there is no need for a specific bracket that is used for fixing an electronic control unit in the related art, so it is possible to reduce the number of necessary parts and manufacture the entire product in a compact size.

Further, there is no need for a lead wire used for changing the limited direction of connecting ports of a connector in the related art, it is possible to make assemblage easy, and it is also possible to secure an assembly space without interference with surrounding parts because the direction of a connector can be changed to fit to the space for assembling the electronic control unit.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

The above embodiments have been described merely for the purpose of illustrating the technical idea of the present disclosure, and those skilled in the art will appreciate that various modifications and changes are possible without departing from the scope and spirit of the present disclosure. Therefore, the embodiments of the present disclosure are not intended to limit, but to illustrate the technical idea of the present disclosure, and the scope of the technical idea of the present disclosure is not limited by the embodiments. The scope of the present disclosure shall be construed on the basis of the accompanying claims in such a manner that all of the technical ideas included within the scope equivalent to the claims belong to the present disclosure.

What is claimed is:

1. An electronic control unit of a steering system for a vehicle, the electronic control unit comprising:
 a case configured to receive a substrate therein and have shaft supporting portions formed at ends of sides facing each other; and
 a connector configured to be electrically connected with the substrate and coupled to the case through a rotary shaft coupled to ends of the shaft supporting portions such that that direction of connecting ports to be connected with a harness is adjusted,
 wherein a protrusive first coupling portion is formed at any one of the shaft supporting portion and the rotary shaft and a second recessed coupling portion that is coupled to the first coupling portion is formed at the other one so that the connector is coupled and fixed to the case.

2. The electronic control unit of claim 1, wherein the substrate and the connector are electrically connected to each other through electrical wires such that the connector can be rotated about the rotary shaft.

3. The electronic control unit of claim 1, wherein the first coupling portion and second coupling portion are several pieces and arranged circumferentially with the same intervals such that the direction of the connector to be coupled to the case can be adjusted.

4. The electronic control unit of claim 1, wherein at least one first fixing hole is formed at the rotary shaft, at least one second fixing hole is formed at the shaft supporting portion, and a fixing member is inserted in the first fixing hole and the second fixing hole.

5. The electronic control unit of claim 4, wherein:
the at least one first fixing hole and the at least one second fixing hole are formed in the axial direction of the rotary shaft,
the at least one first fixing hole comprises multiple holes and the at least one second fixing hole comprises multiple holes, and
the first fixing holes and the second fixing holes are arranged circumferentially around the first coupling portion and the second coupling portion.

6. The electronic control unit of claim 5, wherein:
the at least one first fixing hole comprises multiple holes and the at least one second fixing hole comprises multiple holes,
the first fixing holes and the second fixing holes are arranged circumferentially with the same intervals, and
a plurality of fixing pins that are inserted into the first fixing holes and the second fixing holes are formed at the fixing member.

7. The electronic control unit of claim 5, wherein:
the at least one first fixing hole comprises multiple holes and the at least one second fixing hole comprises multiple holes,
the first fixing holes and the second fixing holes are arranged circumferentially with the same intervals, and
a supporting member that is inserted and supported in the second fixing holes is disposed in any one of the first fixing holes.

8. The electronic control unit of claim 4, wherein:
the at least one first fixing hole comprises multiple holes and the at least one second fixing hole comprises multiple holes, and
the first fixing holes and the second fixing holes are formed through the first coupling portion and the second coupling portion, respectively, in the radial direction of the rotary shaft, and the first fixing holes or the second fixing holes are formed in two directions to perpendicularly cross each other.

9. The electronic control unit of claim 1, wherein the second coupling portion is formed in a slit shape with an open side such that the connector is easily coupled to the shaft supporting portion.

10. An electronic control unit of a steering system for a vehicle, the electronic control unit comprising:
a connector configured to have a rotary shaft electrically connected with a substrate at an end thereof, have connecting ports connected with a harness at an end of the rotary shaft, have first coupling portions protruding from axial ends of the rotary shaft, and have first fixing holes respectively formed radially through the first coupling portions;
a case configured to receive the substrate therein, have shaft supporting portions formed at ends of sides facing each other to be coupled to the rotary shaft, have second coupling portions at the shaft supporting portions such that the first coupling portions are inserted therein, and have second fixing holes respectively formed at the second fixing portions to communicate with the first fixing holes; and
fixing members configured to be inserted in the first fixing holes and the second fixing holes.

11. The electronic control unit of claim 10, wherein the fixing member is inserted through the first fixing holes and the second fixing holes that communicate with each other.

* * * * *